United States Patent [19]
Roth

[11] Patent Number: 6,154,597
[45] Date of Patent: Nov. 28, 2000

[54] FIBER OPTIC TERMINATION SYSTEM INCLUDING A FIBER OPTIC CONNECTOR ASSEMBLY AND METHOD OF FABRICATING SAME

[75] Inventor: Richard F. Roth, Downers Grove, Ill.

[73] Assignee: Molex Incorporated, Lisle, Ill.

[21] Appl. No.: 09/002,995

[22] Filed: Jan. 5, 1998

[51] Int. Cl.[7] .................................................. B02B 6/00
[52] U.S. Cl. ............................................................ 385/139
[58] Field of Search ............................................ 385/139

[56] References Cited

U.S. PATENT DOCUMENTS

| | | | |
|---|---|---|---|
| 4,186,997 | 2/1980 | Schumacher | 350/96.21 |
| 4,466,696 | 8/1984 | Carney | 350/96.2 |
| 4,515,434 | 5/1985 | Margolin et al. | 350/96.21 |
| 4,725,120 | 2/1988 | Parzygnat | 350/96.22 |
| 4,736,100 | 4/1988 | Vastagh | 250/227 |
| 4,779,946 | 10/1988 | Pimpinella et al. | 350/96.2 |
| 4,779,950 | 10/1988 | Williams | 350/96.21 |
| 4,795,231 | 1/1989 | Tanabe | 350/96.21 |
| 4,982,083 | 1/1991 | Graham et al. | 250/227.11 |
| 5,074,638 | 12/1991 | Poli et al. | 385/50 |
| 5,091,991 | 2/1992 | Briggs et al. | 385/82 |
| 5,125,056 | 6/1992 | Hughes et al. | 385/59 |
| 5,134,675 | 7/1992 | Poli et al. | 385/70 |
| 5,185,825 | 2/1993 | Shigematsu et al. | 385/20 |
| 5,214,731 | 5/1993 | Chang et al. | 385/69 |
| 5,233,674 | 8/1993 | Vladic | 385/56 |
| 5,245,683 | 9/1993 | Belenkiy et al. | 385/72 |
| 5,363,460 | 11/1994 | Marazzi et al. | 385/70 |
| 5,420,951 | 5/1995 | Marazzi et al. | 385/75 |
| 5,506,922 | 4/1996 | Grois et al. | 385/75 |
| 5,570,445 | 10/1996 | Chou et al. | 385/92 |
| 5,608,829 | 3/1997 | Oda et al. | 385/76 |
| 5,619,605 | 4/1997 | Ueda et al. | 385/80 |

*Primary Examiner*—Leon Scott, Jr.
*Attorney, Agent, or Firm*—A. A. Tirva

[57] ABSTRACT

A fiber optic termination system includes a fiber optic cable having at least one optical fiber surrounded by an outer sheath. A crimp ring is crimped to the cable. A fiber optic connector is terminated to the fiber optic cable and includes a ferrule for terminating the optical fiber. A two-part housing assembly for the connector mounts the fiber optic cable and ferrule and also captures the crimp ring therewithin. A boot surrounds the rear end of the housing to hold the housing closed about the crimp ring on the cable.

20 Claims, 15 Drawing Sheets

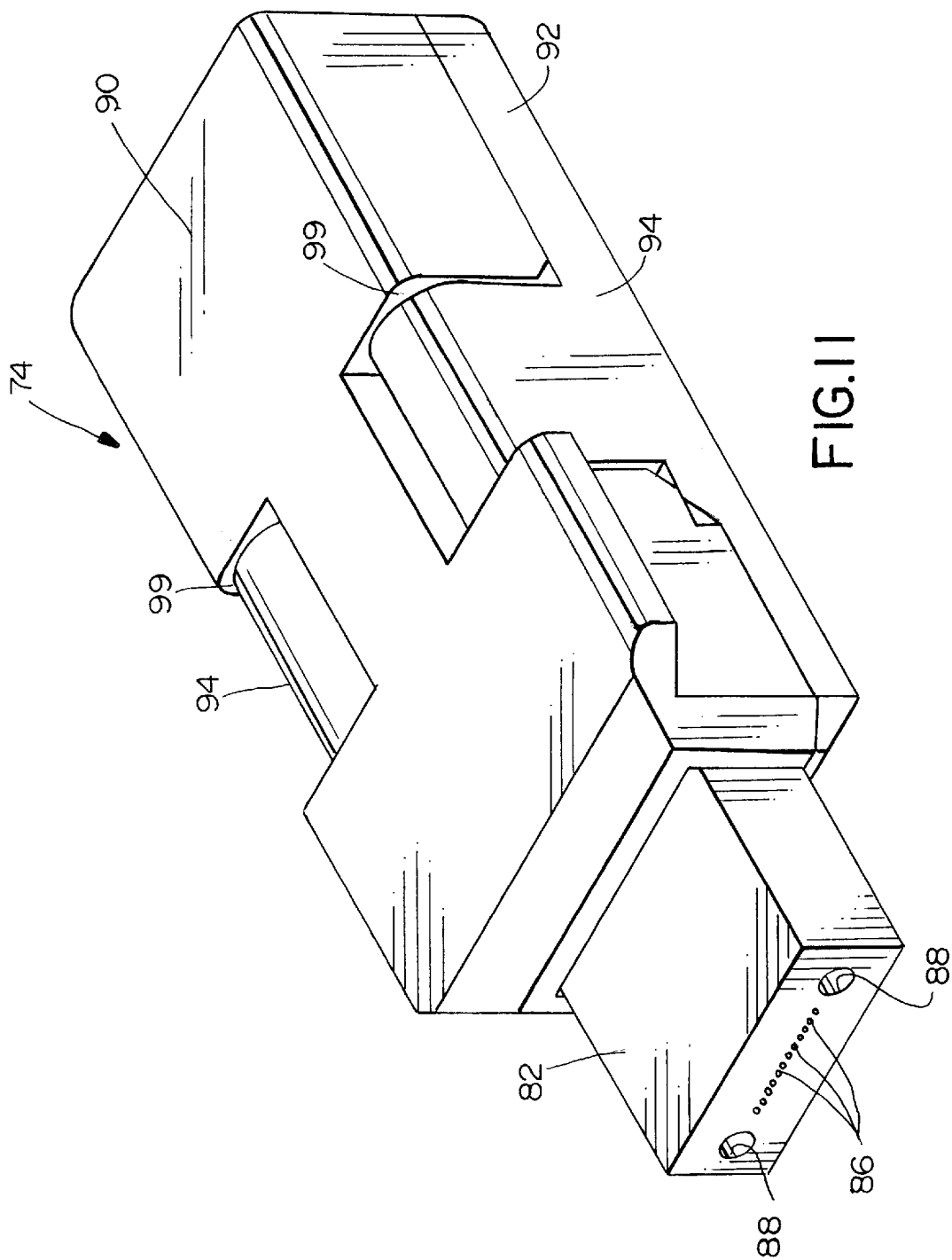

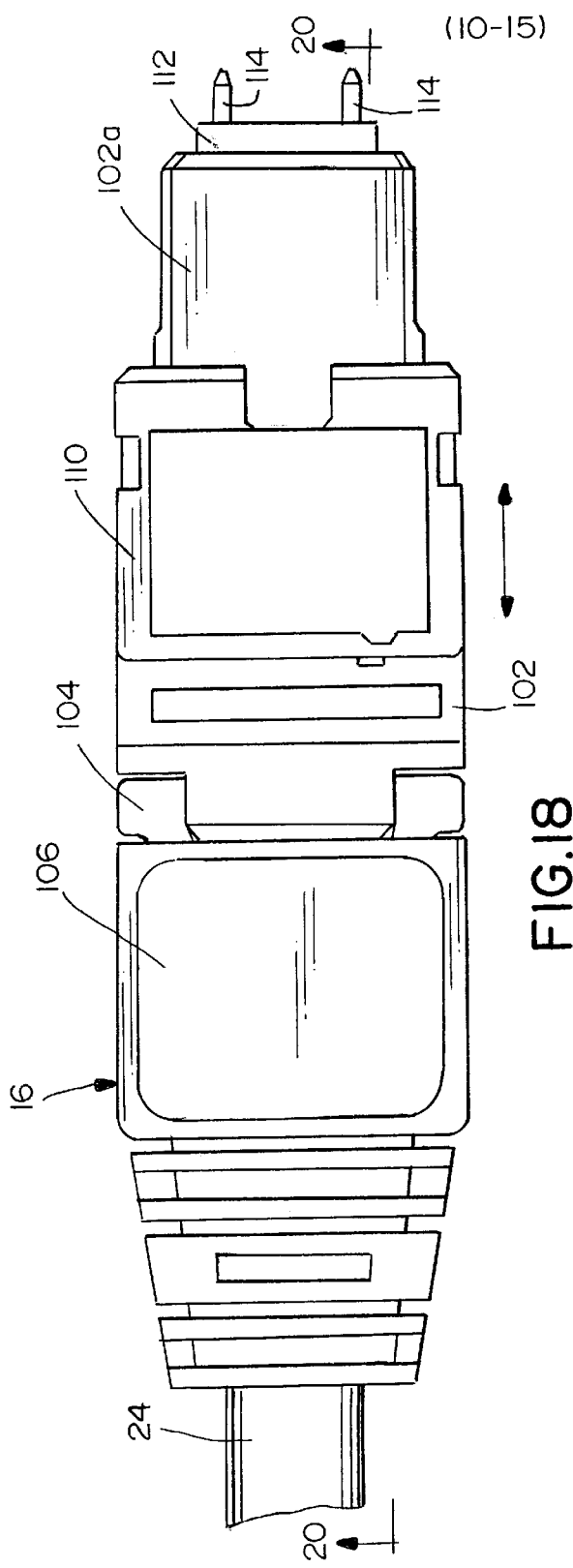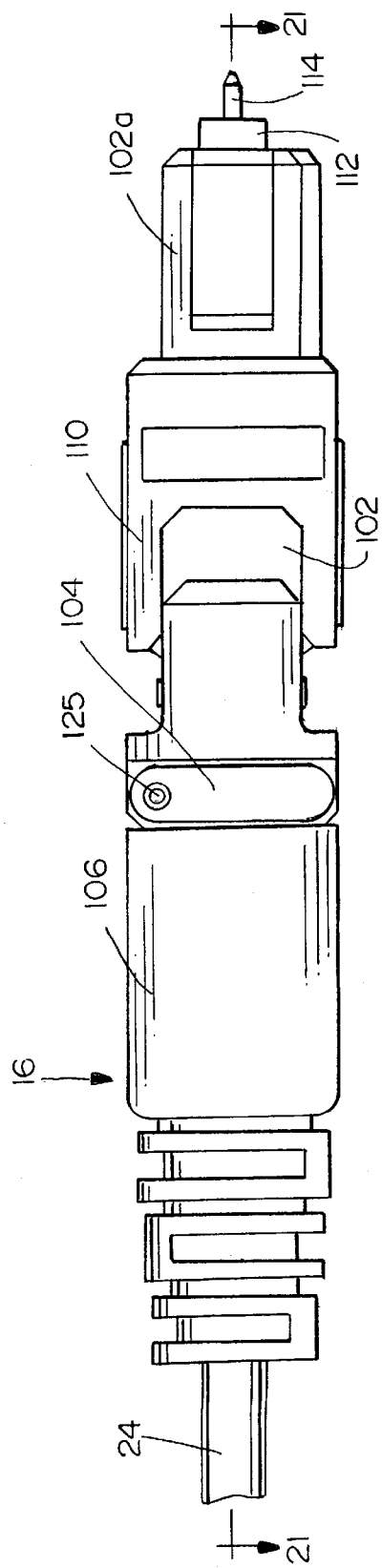

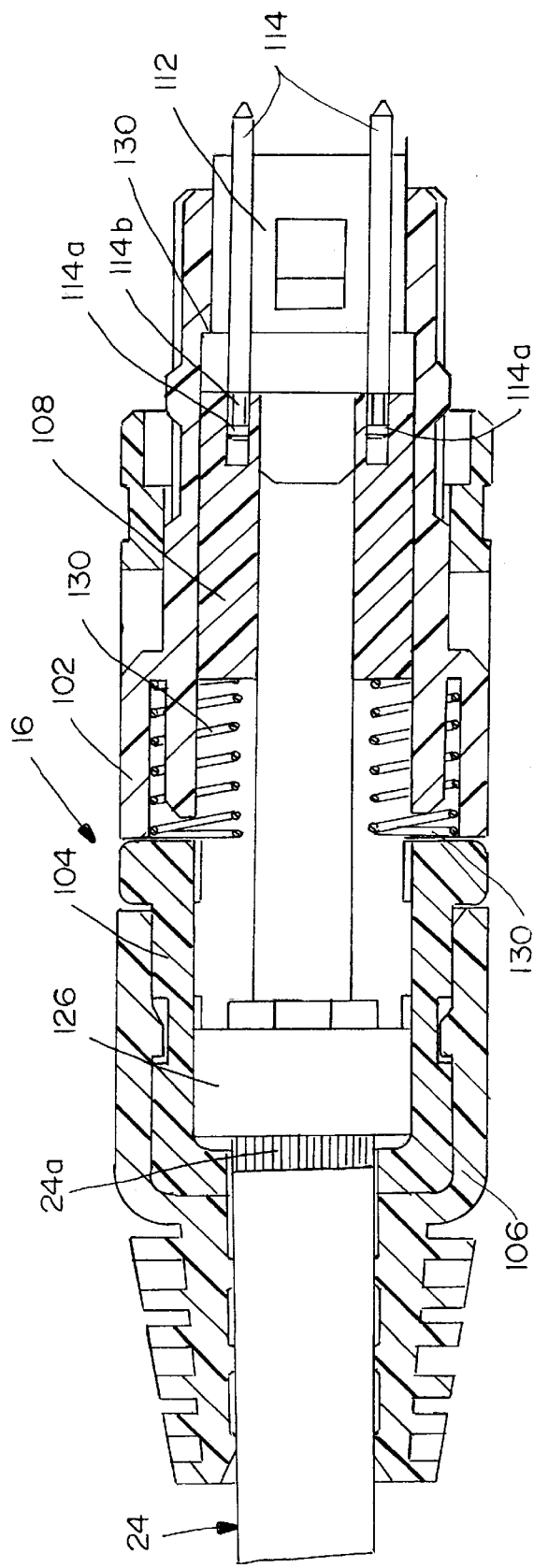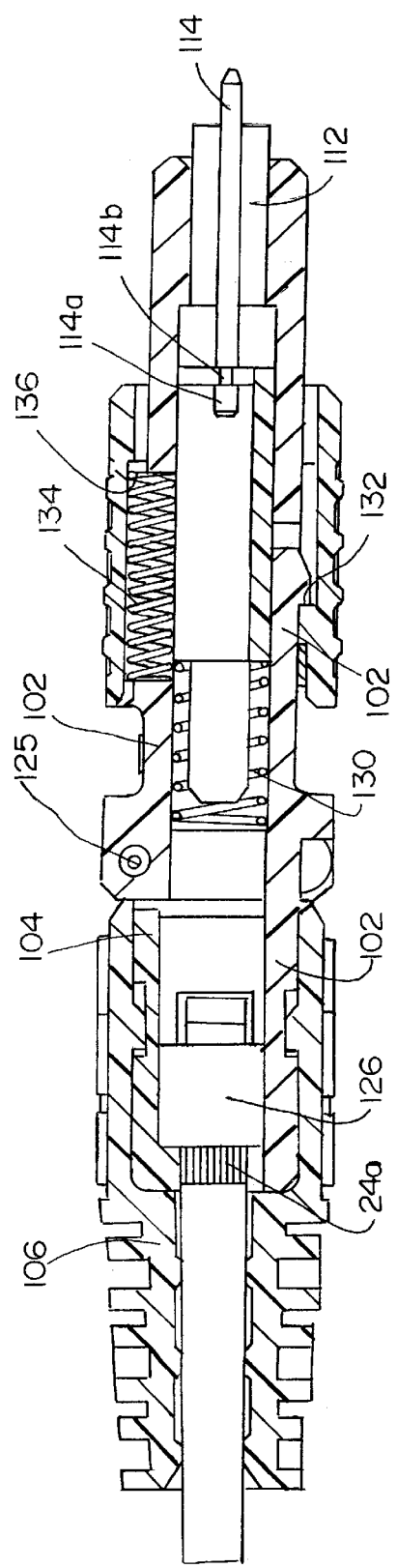
FIG. 21
FIG. 20

FIBER OPTIC TERMINATION SYSTEM INCLUDING A FIBER OPTIC CONNECTOR ASSEMBLY AND METHOD OF FABRICATING SAME

FIELD OF THE INVENTION

This invention generally relates to the art of fiber optic transmission and, particularly, to a fiber optic termination system including a fiber optic connector assembly, as well as a method of fabricating the fiber optic connector assembly.

BACKGROUND OF THE INVENTION

Fiber optic connectors of a wide variety of designs have been employed to terminate optical fiber cables and to facilitate connection of the cables to other cables or other optical fiber transmission devices. A typical optic fiber connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

The present invention is directed to various improvements in such optical fiber apparatus.

SUMMARY OF THE INVENTION

An object of the present invention is to provide a new and improved fiber optic termination system.

Another object of the invention is to provide a new and improved fiber optic connector assembly.

A further object of the invention is to provide a method of fabricating the fiber optic connector assembly.

In the exemplary embodiment of the invention, a fiber optic cable includes at least one optical fiber surrounded by an outer sheath. A length of the fiber is exposed at an end thereof. A crimp ring is crimped to the outer sheath spaced from the fiber end. A fiber optic connector is terminated to the fiber optic cable and includes a ferrule for terminating the optical fiber. A connector housing assembly is provided about the ferrule and includes a housing part and a cover part. The cover part is movably mounted on the housing part for movement between an open position allowing assembly of the fiber optic cable, including the crimp ring, therewithin, and a closed position capturing the crimp ring within the housing assembly with the optical fiber terminated by the ferrule.

As disclosed herein, the cover part is pivotally mounted on the housing part, and a rear portion of the housing part cooperates with the pivotally mounted cover part to capture the crimp ring therebetween. A boot is positionable about the rear end of the housing assembly for holding the cover part in its closed position.

The invention contemplates the method of fabricating a fiber optic connector assembly including the aforementioned capturing of the crimp ring on the fiber optic cable within the two-part housing assembly.

In addition to the housing part, the cover part, the ferrule and the boot, the fiber optic connector assembly herein includes a latch movably mounted on the housing intermediate the ends thereof for latching the connector to a complementary mating connector or other associated fiber optic transmission means. As disclosed herein, the latch comprises a slide sleeve surrounding the housing, and spring means are operatively associated between the slide sleeve and the housing for biasing the sleeve toward a latching condition.

The connector assembly further includes a pin holder within the housing rearwardly of the ferrule for mounting at least one alignment pin. The pin projects through the ferrule and beyond a front mating face of the ferrule for alignment association with the complementary mating connector or other associated fiber optic transmission device. Spring means are operatively associated between the pin holder and the housing for biasing the pin holder and the ferrule forwardly of the housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 11 is a perspective view of the inner housing insert of the board connector, with the fiber ferrule projecting therefrom;

FIG. 18 is a top plan view of the cable connector;

FIG. 19 is a side elevational view the cable insert;

FIG. 20 is a vertical section taken generally along line 20—20 of FIG. 18;

FIG. 21 is a horizontal section taken generally along line 21—21 of FIG. 19;

DETAILED DESCRIPTION OF THE PREFERRED EMBODIMENT

Figure 1:
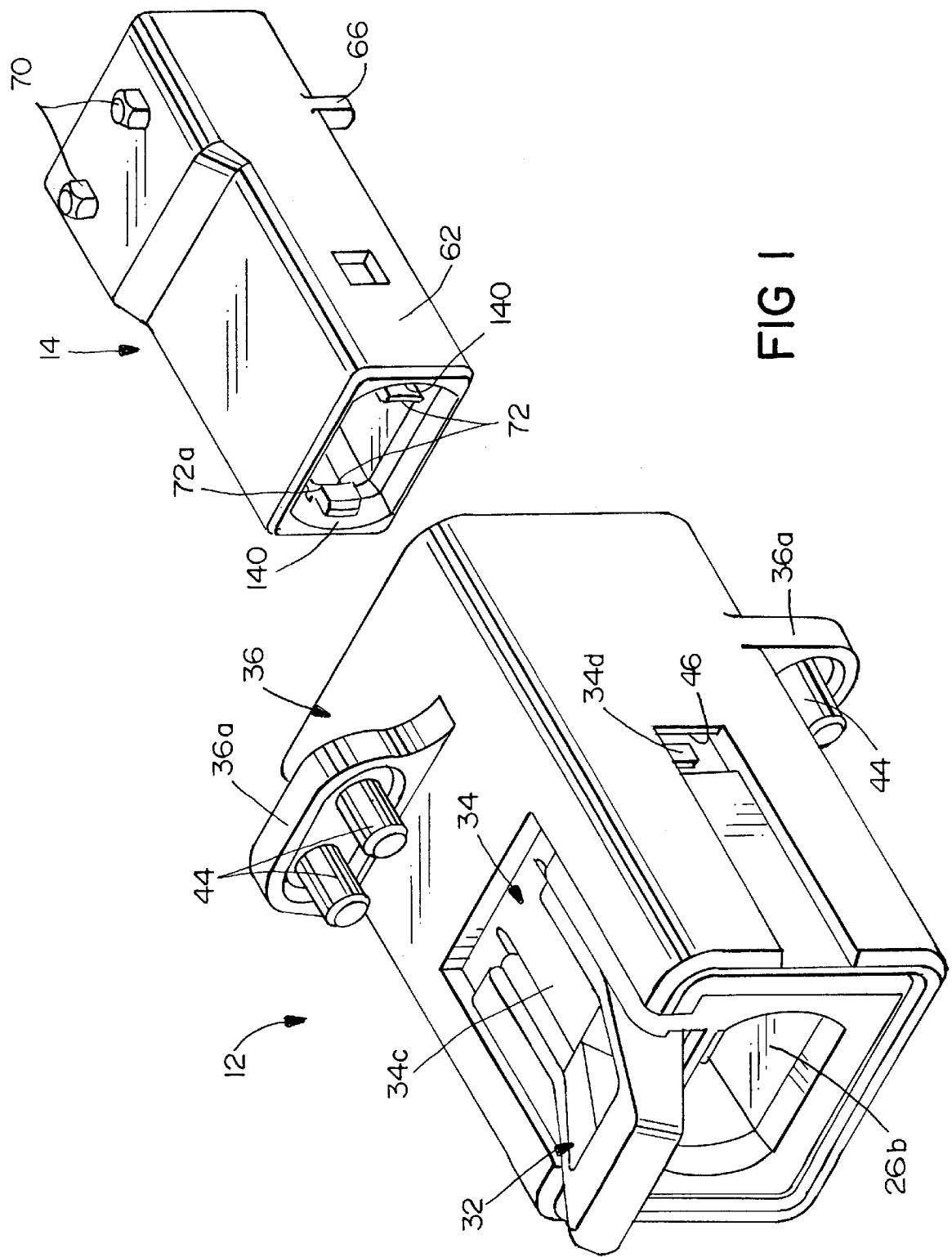
FIG. 1 is a perspective view of the adapter and the board connector of the invention.
Figure 2:
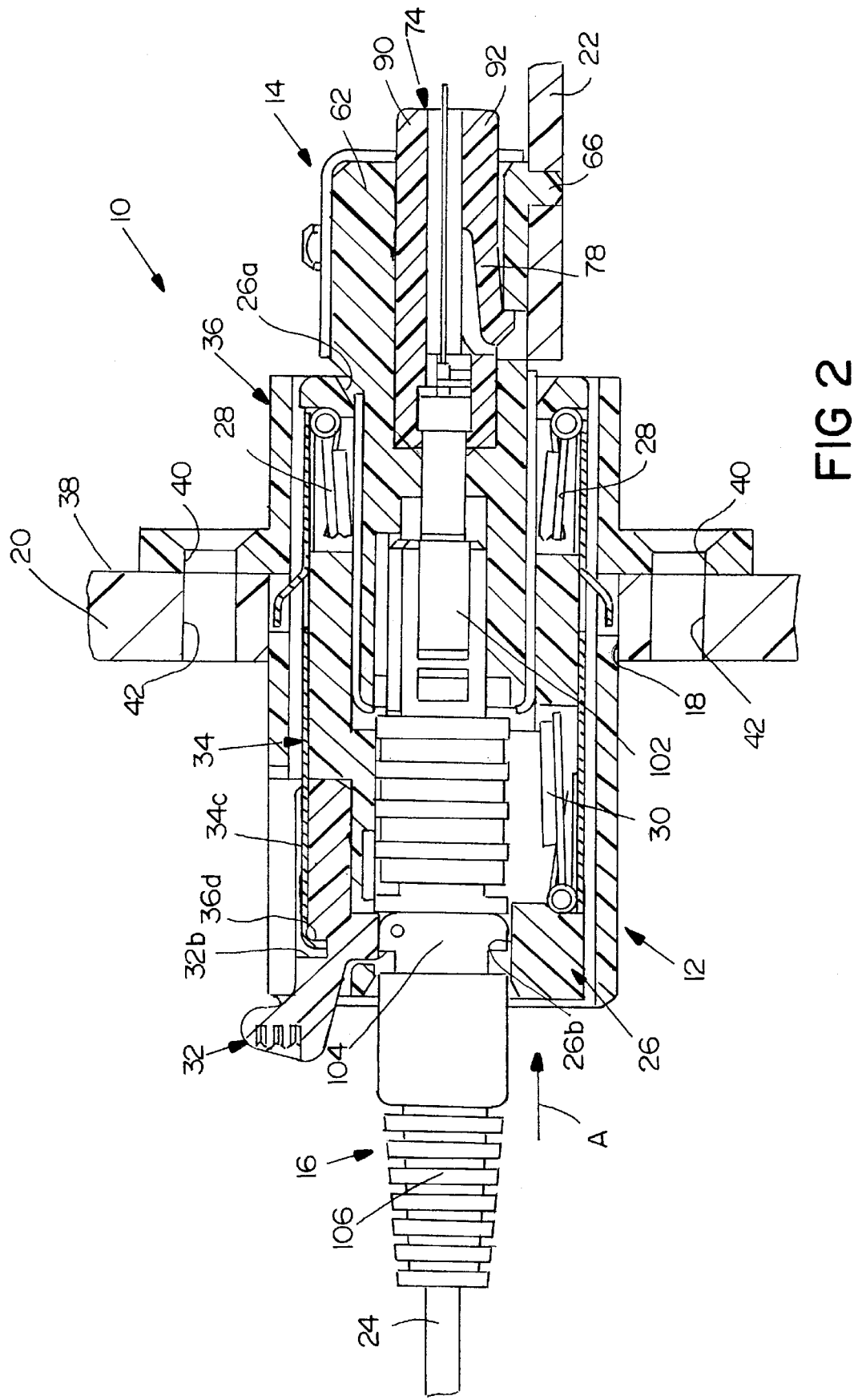
FIG. 2 is an axial section through the adapter with the board connector inserted into one end thereof, along with an elevational depiction of a cable connector inserted into the opposite end of the adapter.

Referring to the drawings in greater detail, and first to FIGS. 1 and 2, the invention is embodied in a fiber optic connector/adapter assembly, generally designated 10, which includes three main components, namely: an adapter assembly, generally designated 12; a board connector, generally designated 14; and a cable connector, generally designated 16. Adapter assembly 12 is designed for mounting in an opening 18 in a panel, backplane or circuit board 20. Board connector 14 is adapted for mounting near the edge of a printed circuit board 22. Cable connector 16 is adapted for terminating a fiber optic cable 24. While board connector 14 is mounted on circuit board 22, the board connector also could be provided for terminating a fiber optic cable. However, for clarity purposes herein, connector 14 will be referred to as the "board" connector and connector 16 will be referred to as the "cable" connector.

Adapter assembly 12 includes an inner housing 26 which surrounds the mating ends of board connector 14 and cable connector 16 and defines the interface area therebetween. The inner housing has a first receptacle end 26a for receiving board connector 14 and a second receptacle end 26b for receiving cable connector 16. A pair of shutter members or doors 28 close and open first receptacle end 26a, and a single shutter member or door 30 closes and opens second receptacle end 26b. A latch, generally designated 32 is movably mounted on inner housing 26 for latching engagement with cable connector 16. A metal shell, generally designated 34, embraces a portion of inner housing 26. An outer housing bracket, generally designated 36, substantially surrounds the adapter assembly and provides means for mounting the assembly within opening 18 in panel 20.

More particularly, still referring to FIGS. 1 and 2, outer housing bracket 36 of adapter assembly 12 includes upper and lower flanges 36a for mounting the adapter assembly against a face 38 of panel 20. The flanges may have holes 40 (FIG. 2) aligned with holes 42 in the panel for receiving appropriate fastening means such as screws, bolts or the like. On the other hand, outer housing bracket 36 is a unitary structure molded of dielectric material such as plastic or the like, and flanges 36a may include integral mounting studs 44 (FIG. 1) for projecting into holes 42 in panel 20.

Figure 3:
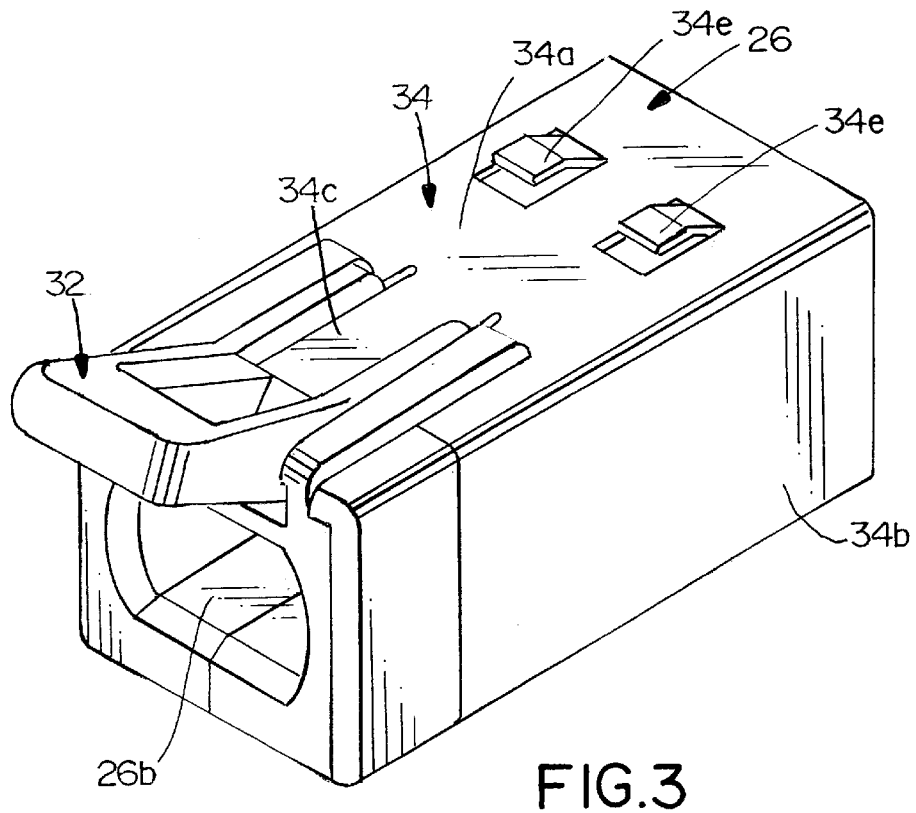
FIG. 3 is a perspective view of the adapter, with the outer housing bracket removed.
Figure 7:
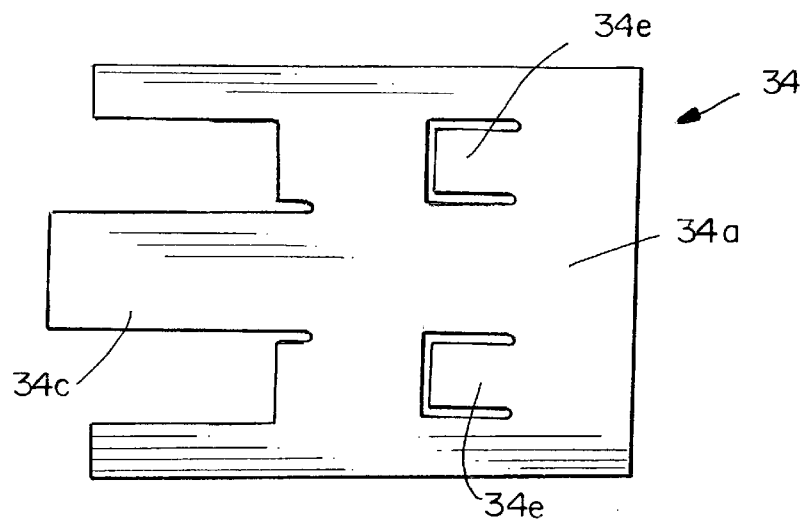
FIG. 7 is a top plan view of the metal shell of the adapter.
Figure 8:
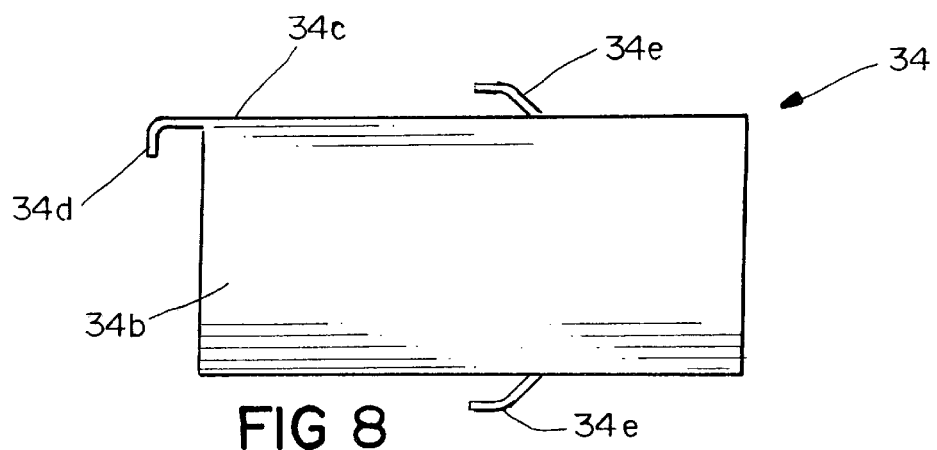
FIG. 8 is a side elevational view of the shell.

Referring to FIGS. 3, 7 and 8, metal shell 34 of adapter assembly 12 is a one-piece, stamped and formed sheet metal component. The shell is generally U-shaped to include a top wall 34a and side walls 34b for embracing the top and sides of inner housing 26 as seen best in FIG. 3. The shell has a forwardly projecting, cantilevered spring arm 34c which is provided with a downwardly or inwardly turned hook portion 34d at the distal end thereof. The spring arm is provided for spring loading latch 32, as described hereinafter. A pair of stamped and formed resilient tabs 34e project outwardly from side walls 34b of the metal shell and project through openings 46 (FIG. 1) in the sides of outer housing bracket 36 to mount the shell and inner housing therewithin. The subassembly of inner housing 26, latch 32 and metal shell 30 are inserted in the direction of arrow "A" into outer housing bracket 36, compressing resilient tabs 34d, until the tabs snap back outwardly into openings 46 in the outer housing bracket to hold the adapter assembly in assembled condition.

Figure 9:
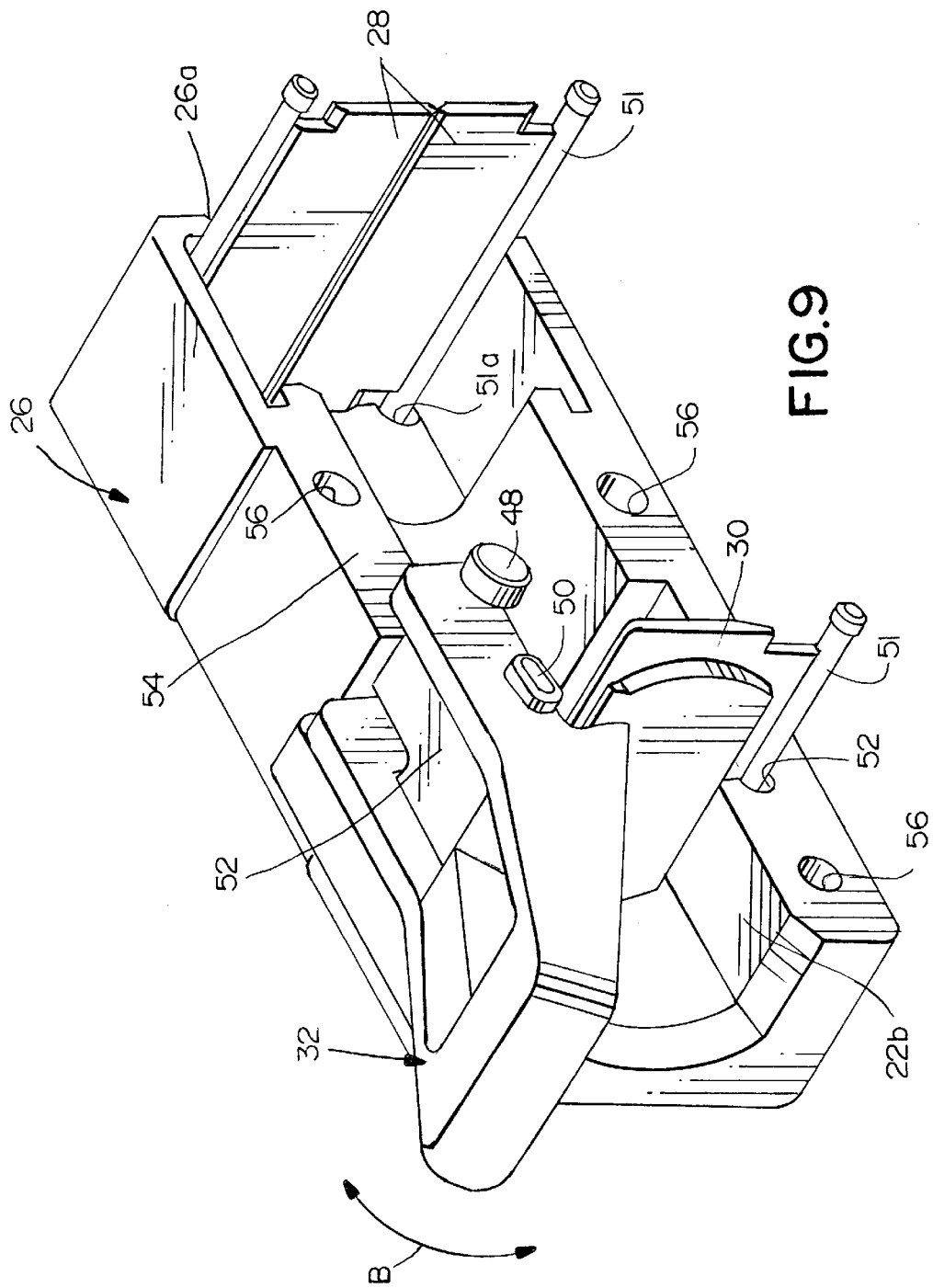
FIG. 9 is a broken-away perspective view of the adapter inner housing, pivoted latch and pivoted shutters.

Referring to FIG. 9 in conjunction with FIGS. 1–6, latch 32 includes a pair of pivot trunions 48 (FIG. 9) which are captured in inner housing 26 and mount the latch for pivotal movement relative to the inner housing in the direction of double-headed arrow "B" (FIG. 9). A stop boss 50 engages a top wall 52 of the inner housing to define the completely latched condition of the latch. The latch includes a downwardly or inwardly projecting latch portion 32a (FIG. 6) which engages behind a shoulder of cable connector 16 to prevent the connector from being pulled out of adapter assembly 12. The latch has a groove 32b on the top or outside thereof for receiving hook 34d of latch arm 34c of metal shell 34. Therefore, the resilient metal latch arm is effective to bias latch 32 toward its latched position in engagement with cable connector 16.

Figure 4:
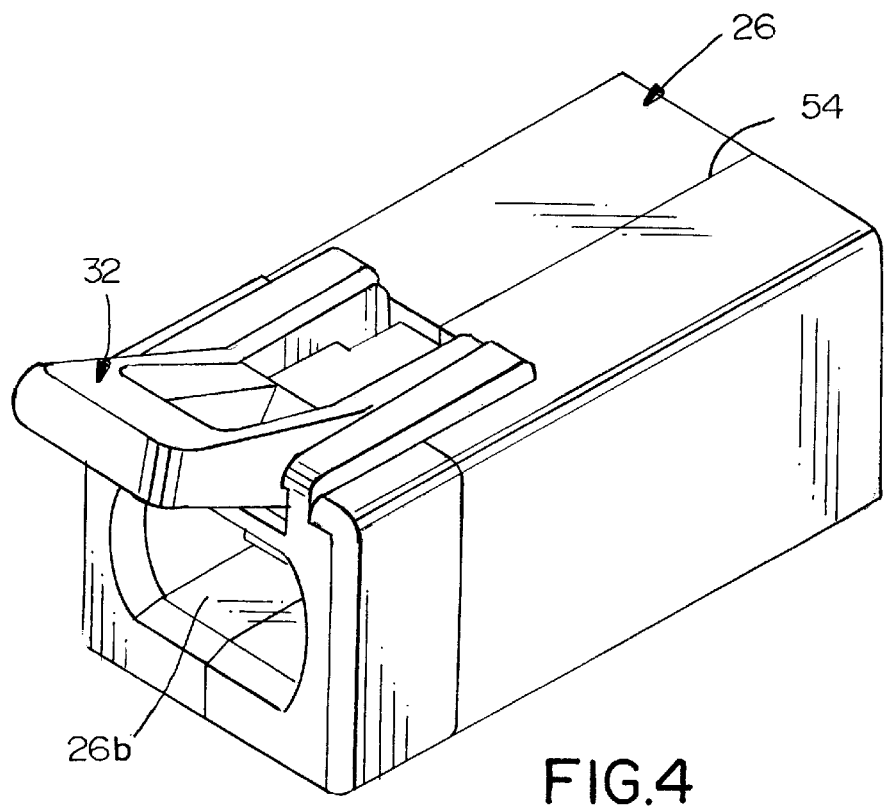
FIG. 4 is a view similar to that of FIG. 3, with the metal shell of the adapter removed.

FIGS. 2, 5, 6 and 9 best show the mounting and movement of shutter members or doors 28 which close and open receptacle end 26a, as well as the single shutter member or door 30 which closes and opens receptacle end 26b. More particularly, each of doors 28 and 30 are one piece structures unitarily molded of dielectric material such as plastic or the like, although other materials are contemplated. Each door includes a pivot rod portion 51 integral therewith. The pivot rod portions of doors 28 are journalled in bores 51a (FIG. 9) within inner housing 26, and the pivot rod portion of door 30 is journalled in a bore 52 in the inner housing. In order to provide for assembly of latch 32 and doors 28 and 30 within the inner housing, the inner housing is fabricated in two parts joined at an interface 54 (FIGS. 4 and 9). One part may have appropriate holes 56 (FIG. 9) for receiving pegs from the other part with a press-fit to provide an interference or frictional securement between the parts.

Figure 5:
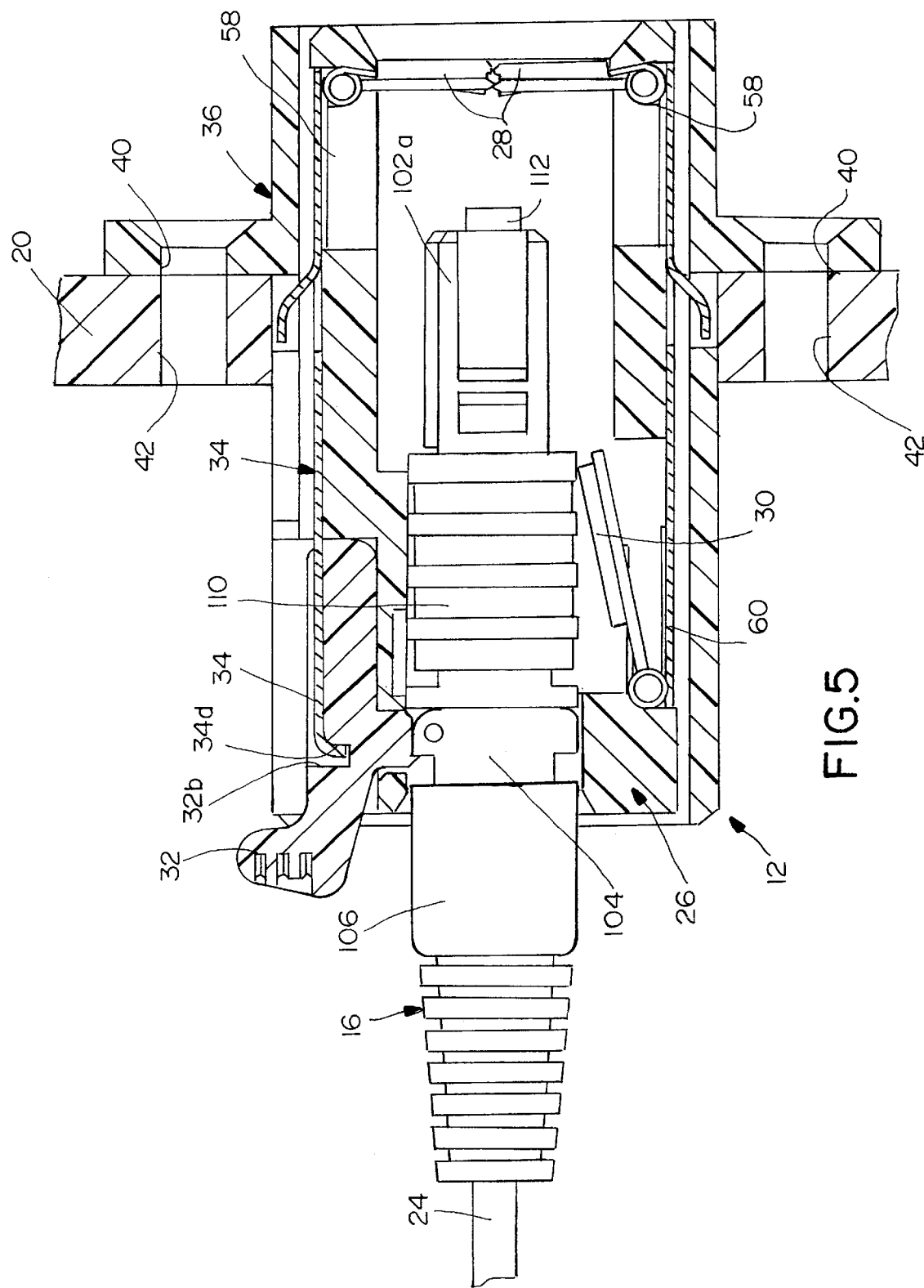
FIG. 5 is a view similar to that of FIG. 2, with the board connector removed from the adapter.
Figure 6:
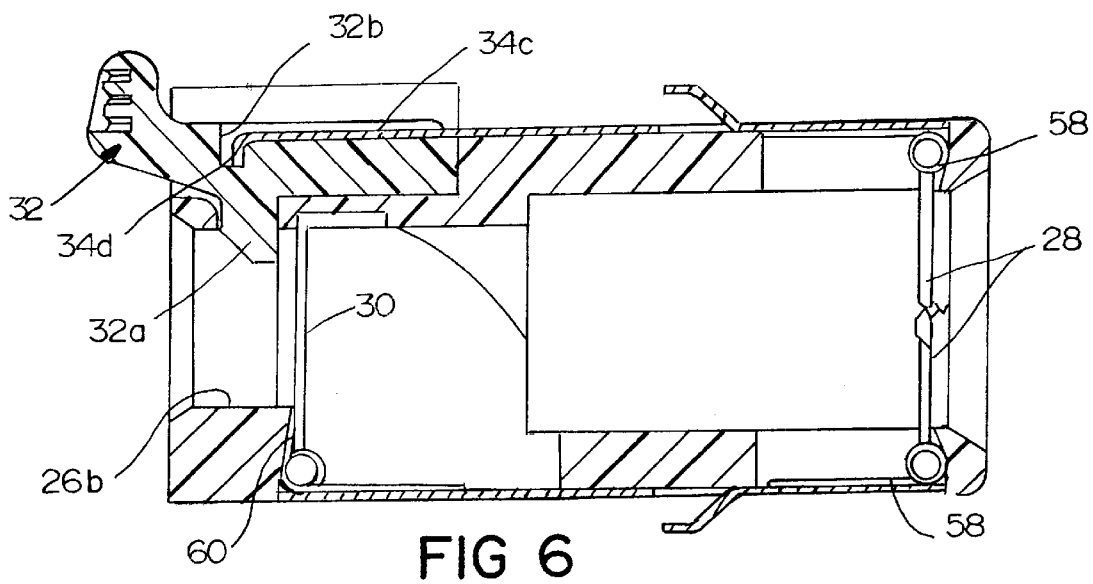
FIG. 6 is a view similar to that of FIG. 5, with the cable connector removed.

As best seen in FIGS. 2, 5 and 6, doors 28 are spring loaded by torsion springs 58 and door 30 is spring loaded by a torsion spring 60 to bias the doors toward their closed positions as shown in FIGS. 6 and 9. The doors 28 and 30 intersect any light beams and prevent light energy from exiting the adapter when the doors are closed. The doors also prevent dust from entering the adapter when one or both of the connectors are removed. FIG. 5 shows door 30 forced open against the biasing of torsion spring 60 by the insertion cable connector 16. FIG. 2 shows doors 28 forced open by the insertion of board connector 14 against the biasing of torsion springs 58.

The use of a pair of opposing doors 28, versus a single door, to close one of the receptacle ends of the adapter assembly has a number of advantages. First, the two doors save considerable axial space which otherwise would be required to accommodate the full pivoting action of a single door which would be twice as big as each of the pair of doors. Second, it is easier to open the two smaller doors because smaller springs can be provided. The connector is biased by the doors to the center and, thereby, most forces are applied near the edges of the doors, whereas with a single door a large force is required on one side of the centerline than the other side. Third, the torsion springs can extend all the way to the closing edges of the two doors to provide more uniform forces on the doors than is possible when the torsion spring extends only to the center of the door as with the single door 30. Extending the spring all the way to the edge of the larger door 30 would create less uniformity in the forces and require a larger spring. Fourth, the wiping surface of either of the pair of doors 28 is one-half the wiping surface of the single door 30. With the single door, dust collected on the outside of the door is carried all the way toward the interface area between the connectors. With the two doors 28, any dust which accumulates on the outer surfaces thereof will be deposited primarily on the sides of the board connector rather than being carried interiorly by the mating face of the board connector. A single door 30 is used at receptacle end 26b because of the existence of latch 32 and the inability to accommodate a double-door arrangement.

Figure 10:
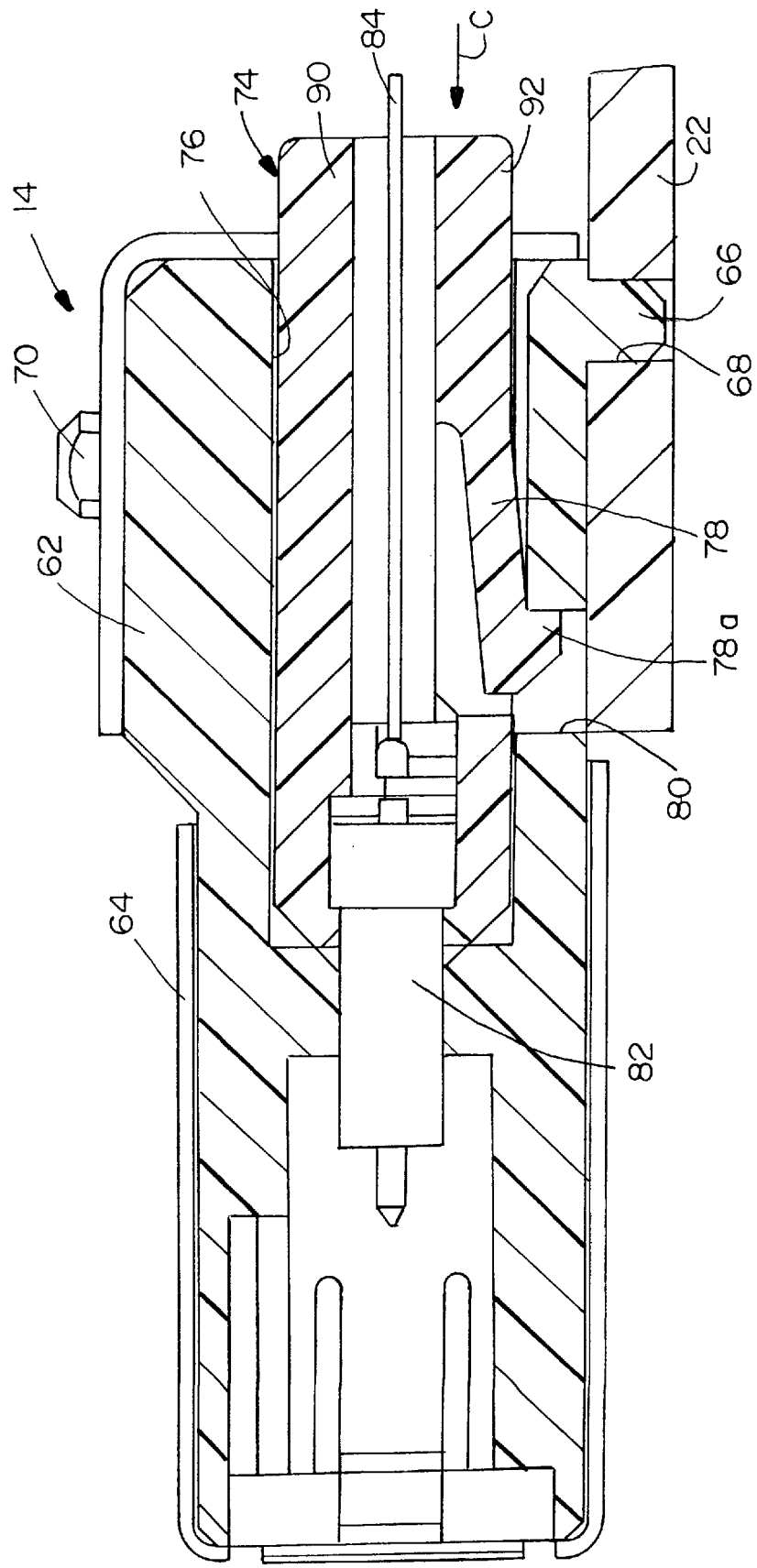
FIG. 10 is an axial section through the board connector mounted at an edge of a circuit board.
Figure 14:
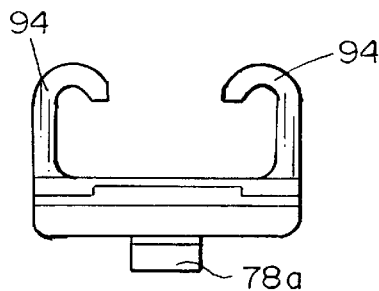
FIG. 14 is an end elevational view of the lower half of the housing insert.

Referring to FIG. 10 in conjunction with FIGS. 1 and 2, board connector 14 includes an outer housing 62 substantially surrounded by a metal shield 64. The metal shield is removed in FIG. 1. The outer housing includes a pair of downwardly projecting mounting posts 66 for insertion into mounting holes 68 in circuit board 22 to mount the board connector to the circuit board. The outer housing has a pair of upwardly projecting bosses 70 for facilitating securing metal shield 64 thereto. The outer housing has a pair of interior, forwardly projecting latch arms 72 (FIG. 1) for latchingly engaging cable connector 16, as described hereinafter.

Referring to FIG. 11 in conjunction with FIGS. 2 and 10, an inner housing insert, generally designated 74, is inserted in the direction of arrow "C" into a cavity 76 within outer housing 62. The inner housing insert has a forwardly projecting cantilevered latch arm 78 provided with a hook portion 78a for latching into a hole 80 in the bottom of outer housing 62 to hold the housing insert within the outer housing. In essence, inner housing insert 74 provides a ferrule holder for embracing and mounting a ferrule 82 which terminates the fibers of a fiber optic ribbon cable 84 (FIG. 10). Fiber ends 86 (FIG. 11) are exposed at a mating face 82a of ferrule 82. The ferrule has a pair of alignment holes 88 for receiving alignment pins from a ferrule of cable connector 16, as described hereinafter.

Figure 12:
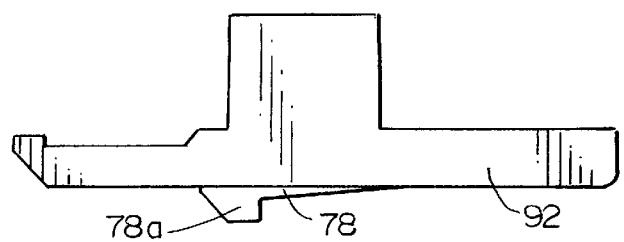
FIG. 12 is a side elevational view of the lower half of the inner housing insert of the board connector.
Figure 13:
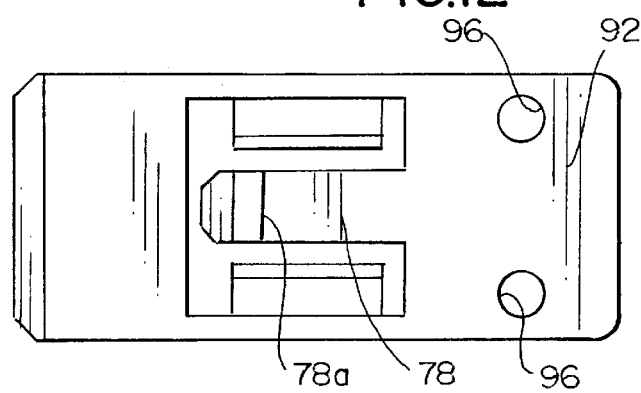
FIG. 13 is a bottom plan view of the lower half of the housing insert.
Figure 16:
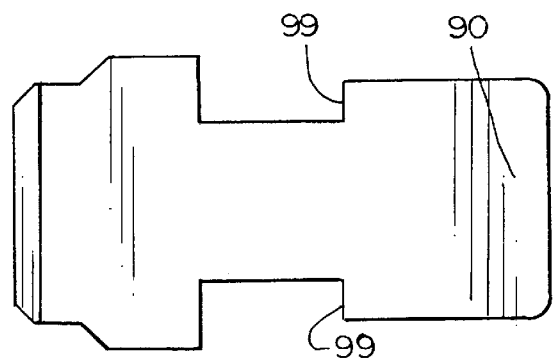
FIG. 16 is a top plan view of the upper half of the housing insert.
Figure 17:
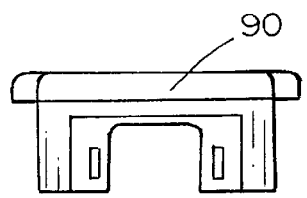
FIG. 17 is an end elevational view of the upper half of the housing insert.
Figure 15:
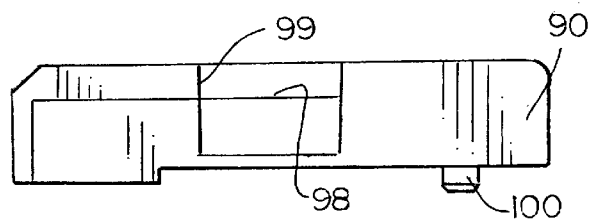
FIG. 15 is a side elevational view of the upper half of the housing insert.

Referring to FIGS. 12–17 in conjunction with FIG. 11, inner housing insert 74 is a two-part structure including a top half 90 and a bottom half 92. The insert halves each may be fabricated of molded dielectric plastic material. FIG. 12 shows bottom insert half 92 including latch arm 78, along with a pair of inwardly-turned side hooks 94 and a pair of assembly holes 96. FIGS. 15–17 show that top insert half 90 includes side shoulders 98 within side recesses 99, along with a pair of assembly pegs 100. The two halves 90 and 92 of insert housing 74 are assembled by aligning hooks 94 of bottom half 92 with recesses 99 at the sides of top half 90. Assembly pegs 100 at the bottom of the top half also are aligned with assembly holes 96 in the top of the bottom half. The two halves are moved toward each other until hooks 94 of the bottom half snap into engagement with shoulders 98 of the top half, whereupon the two halves are locked together in assembled condition as shown in FIG. 11.

FIGS. 18–21 show cable connector 16 in assembled condition and FIGS. 22–39 show various components of the cable connector. Referring first to FIGS. 18–20, the cable connector includes an inner housing 102 (FIGS. 22–25) which includes a pivotally mounted rear cover 104 (FIGS. 26–28); a rear boot 106 (FIGS. 29–31) which surrounds the rear end of the housing and cover; a pin holder 108 (FIGS. 33–35 which mount a pair of alignment pins; and a front pull latch 110 (FIGS. 36–39) for latchingly engaging the cable connector with board connector 14 within adapter assembly 12.

More particularly, referring to FIGS. 22–25 in conjunction with FIGS. 18–21, inner housing 102 includes a forward mating end 102a which mounts a ferrule which terminates the fibers of fiber optic cable 24. A pair of alignment pins 114 extend through ferrule 112 and into alignment holes 88 in ferrule 82 (FIG. 11) of board connector 14. The mating end 102a of the inner housing also has a latch rib 102b on the outside thereof. The inner housing is generally hollow and both the top and bottom walls thereof include an elongated opening 102c and a cantilevered, flexible latch arm 102d. A bottom shelf 102e projects rearwardly of the inner housing and a top pivot boss 102f also projects rearwardly of the housing. The bottom shelf has a boot latch recess 116, and the top pivot boss has a through pivot bore 118.

Figure 26:
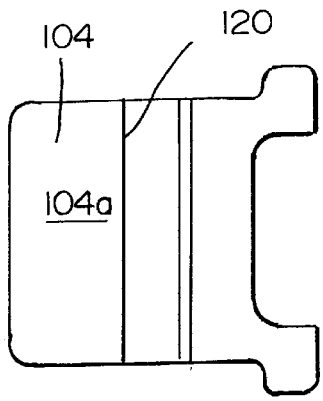
FIG. 26 is a top plan view of the cable connector rear cover.
Figure 27:
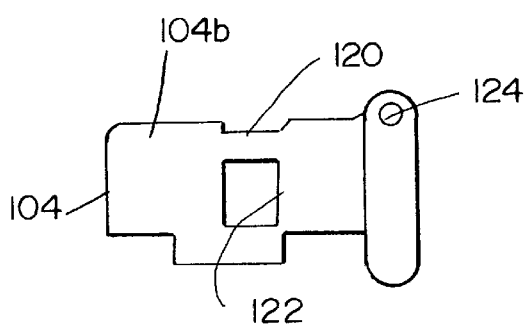
FIG. 27 is a side elevational view of the cable connector rear cover.
Figure 28:
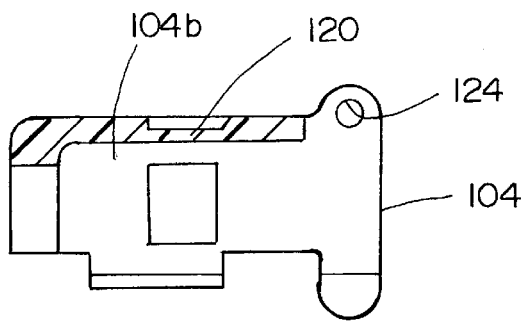
FIG. 28 is a vertical section taken generally along line 28—28 of FIG. 26.

Referring to FIGS. 26–28 in conjunction with FIGS. 18–25, rear cover 104 has a top wall 104a and a pair of depending side walls 104b. A boot latch recess 120 is formed in the outside of top wall 104, and a boot latch recess 122 is formed in the outside of each side wall 104b. A pivot hole 124 is formed through the upper/inner corners of side walls 104b. Rear cover 104 is pivotally mounted to inner housing 102 by means of a pivot shaft 125 (FIG. 20) which extends through pivot bore 118 in inner housing 102 and pivot holes 124 in rear cover 104. Therefore, the rear cover is pivotally mounted on the inner housing for movement between an open condition allowing assembly of fiber optic cable 24 within the housing and a closed position clamping the cable within the housing and its rear cover.

More particularly, as seen in FIG. 21, fiber optic cable 24 has an enlarged crimp ring 126 captured within the rear of housing 102 and cover 104. As is known in the art, most fiber optic cables have strength members (fibrous) running the length of the cable. When the cable is terminated, these strength members are folded backwardly of the cable, as at 24a, to expose the fibers, and the strength members are crimped by a crimp ring such as ring 126. Therefore, the crimp ring is in direct engagement with the strength members of the cable. With the invention, housing 102 and cover 104 are effective to capture the crimp ring and thereby transfer any forces from the connector to the strength members of the cable.

Figure 30:
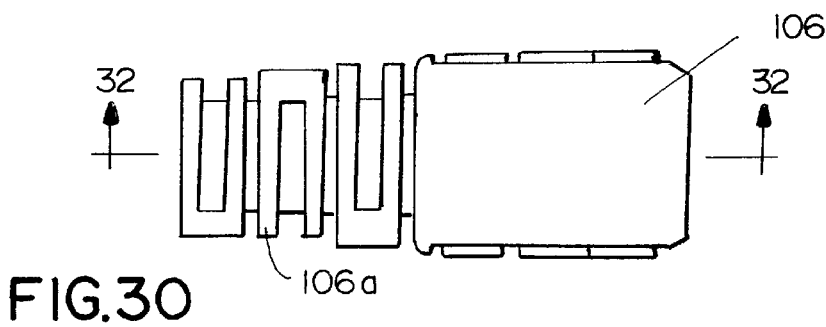
FIG. 30 is a side elevational view of the boot.
Figure 29:
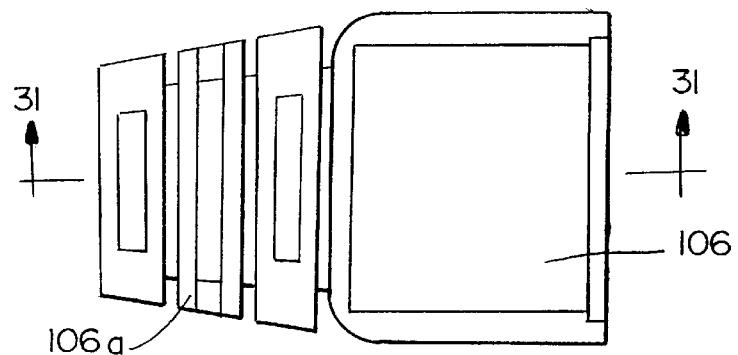
FIG. 29 is a top plan view of the cable connector boot.
Figure 32:
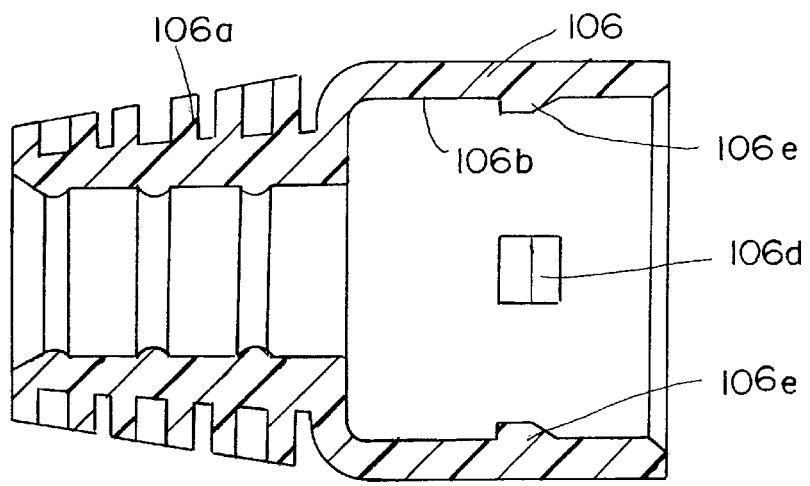
FIG. 32 is a horizontal section taken generally along line 32—32 of FIG. 30.
Figure 31:
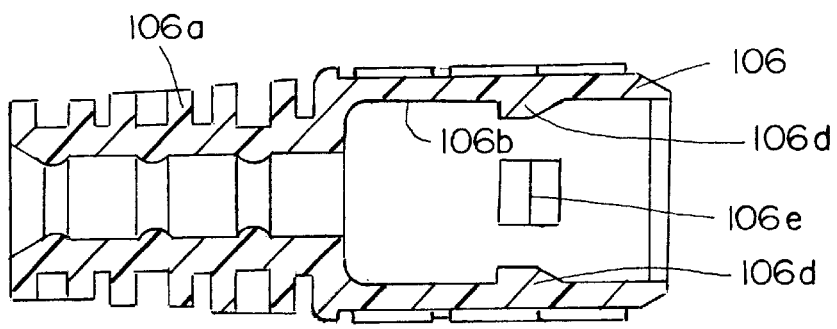
FIG. 31 is a vertical section taken generally along line 31—31 of FIG. 29.

FIGS. 29–31 show the rear boot 106 of cable connector 16. The boot is a one-piece structure fabricated of somewhat flexible material to provide a strain relief means at the rear of the cable. The rear of the boot includes finger-gripping exterior ribs 106a to facilitate gripping the cable connector and inserting the connector into adapter assembly 12. The boot is generally hollow, with a front cavity 106b which surrounds the area of the bottom shelf 102e of the inner housing along with rear cover 104. As seen in FIGS. 31 and 32, cavity 106b is generally rectangular and includes an inwardly projecting latch boss 106c–106d on the inside of each of the four walls of the cavity. Latch boss 106c snaps within boot latch recess 116 (FIGS. 23 and 25) at the bottom of shelf 102e of inner housing 102. Latch boss 106d snaps into recess 120 (FIGS. 26 and 27) on the top of rear cover 104. Latch bosses 106e snap into recesses 102 (FIG. 27) in the sides of the rear cover. Therefore, the boot is securely locked to housing 102 and its rear cover 104 to provide a rear strain relief for cable connector 16. The boot is threaded onto the cable before the cable is prepared and crimp ring 26 is applied. After the cable is assembled in the connector and cover 104 is closed, the boot is moved forwardly to its latched position.

Figure 33:
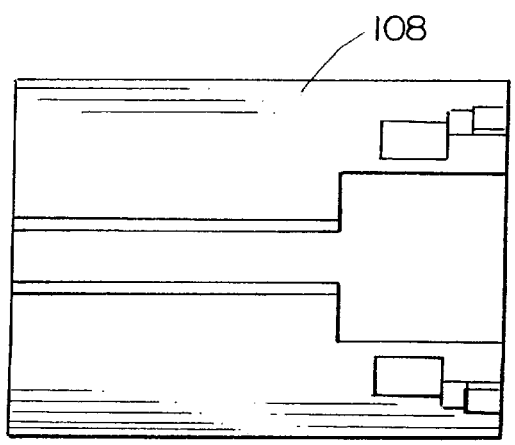
FIG. 33 is a top plan view of the cable connector alignment pin holder.
Figure 34:
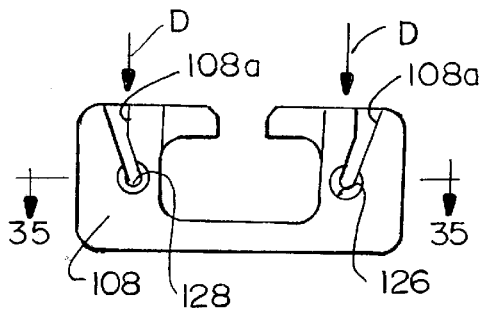
FIG. 34 is an end elevational view of the pin holder.
Figure 35:
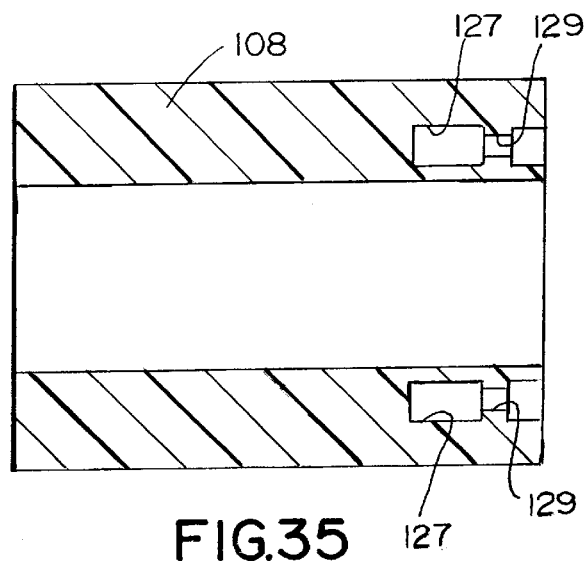
FIG. 35 is a horizontal section taken generally along line 35—35 of FIG. 34.
Figure 36:
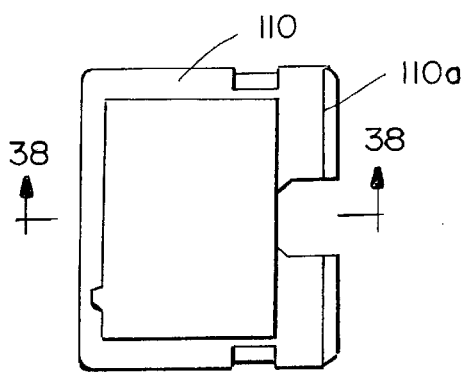
FIG. 36 is a top plan view of the cable connector pull latch.
Figure 37:
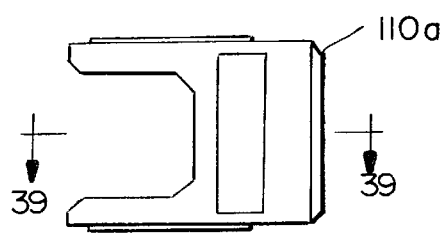
FIG. 37 is a side elevational view of the pull latch.
Figure 38:
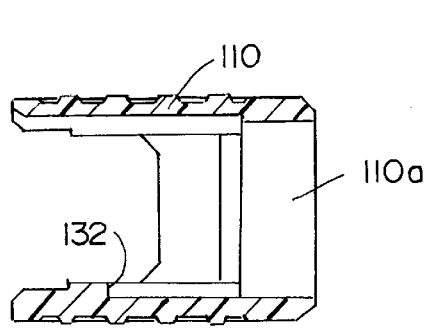
FIG. 38 is a vertical section taken generally along line 38—38 of FIG. 36.
Figure 39:
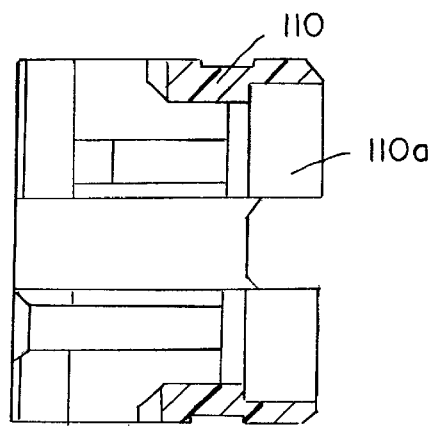
FIG. 39 is a horizontal section taken generally along line 39—39 of FIG. 37.

FIGS. 33–35 show pin holder 108 in greater detail. As seen best in FIG. 21, alignment pins 114 have rear head portions 114a. Pin holder 108 has a pair of troughs 108a (FIG. 34) into which the rear ends of the alignment pins are inserted in the direction of arrows "D", i.e. transversely of the axes of the alignment pins. The pins have reduced diameter portions 114b (FIG. 21) immediately forwardly of rear head portions 114a. Troughs 108a of the pin holder lead to passages shown best in FIG. 35 for capturing the inner head ends of the alignment pins. Specifically, each passage includes an enlarged portion 127 for receiving the head portion 114a and a narrower portion 129 for receiving the reduced diameter 114b of the alignment pin.

FIG. 21 shows that a pair of coil springs 130 are mounted within inner housing 102 for biasing pin holder 108 forwardly of the cable connector. The pin holder abuts the rear of ferrule 112, and alignment pins 114 project through the ferrule. Therefore, the ferrule, alignment pins and the terminated fibers within the ferrule are spring loaded by coil springs 130, through pin holder 108. The two coil springs 130 are laterally spaced relative to a longitudinal or insertion axis of the connector. The laterally spaced springs provide a much more unified force distribution than a single spring. A peripheral shoulder 130 (FIG. 21) engages a complementary shoulder on the inside of the housing to define the forward limit position of the pin holder, ferrule and related components.

Figure 22:
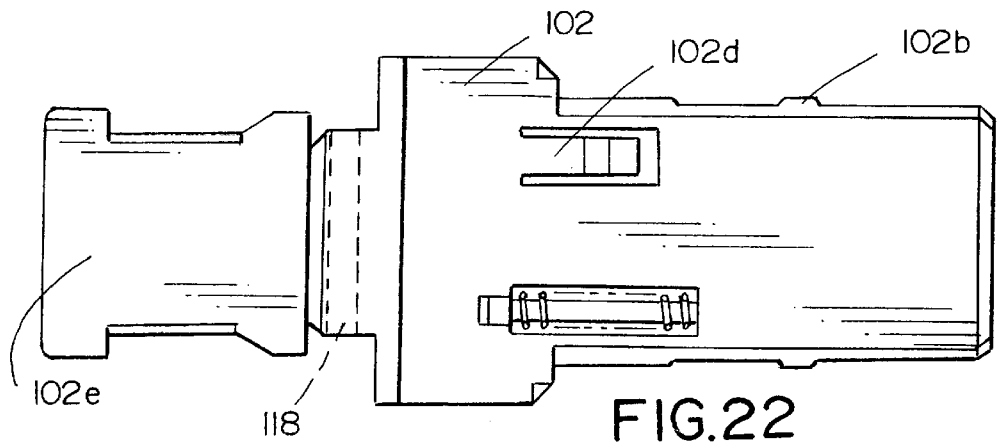
FIG. 22 is a top plan view of the cable connector housing.
Figure 24:
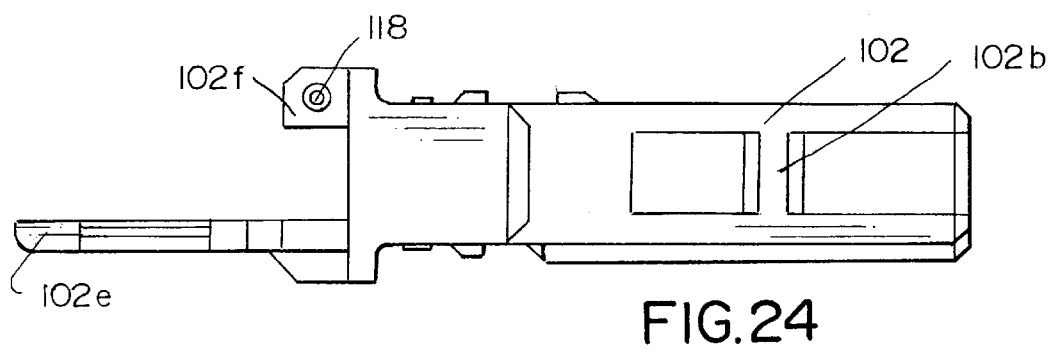
FIG. 24 is a side elevational view of the cable connector housing.
Figure 23:
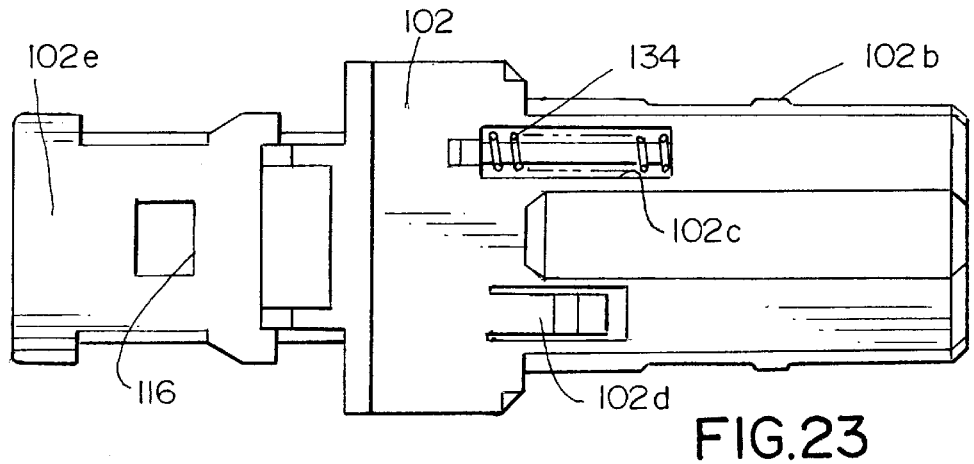
FIG. 23 is a bottom plan view of the cable connector housing.
Figure 25:
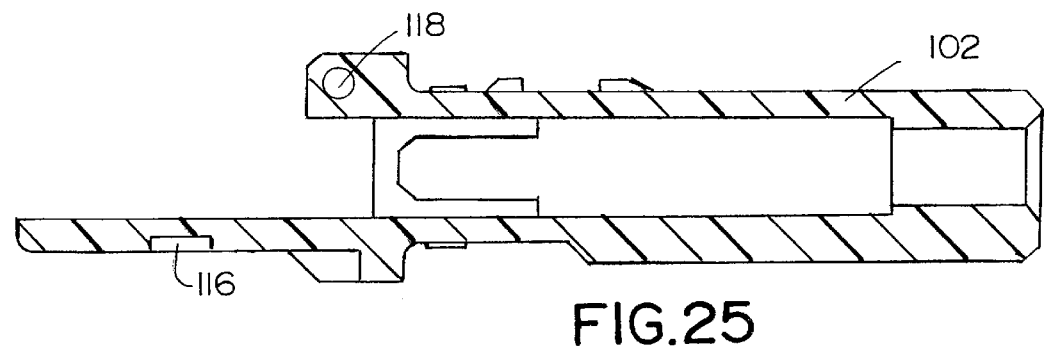
FIG. 25 is a vertical section taken generally along line 25—25 of FIG. 23.

FIGS. 36–39 show pull latch 110 which surrounds inner housing 26 of cable connector 16 for latchingly engaging the cable connector with board connector 14. Specifically, the pull latch is hollow and forms sort of a sleeve surrounding the housing. The pull latch has shoulders 132 on the inside of the top and bottom thereof for latchingly engaging latch arms 102d of the inner housing as best seen in FIG. 20. A pair of coil springs 134 are disposed in elongated openings 102c in the housing as best seen in FIGS. 22 and 23. These coil springs engage shoulders 136 (FIG. 20) on the inside of the pull latch to bias the pull latch forwardly of the connector. The pull latch has what can be considered a forward locking nose portion 110a.

During mating of board connector 14 and cable connector 16, side latch arms 72 (FIG. 1) within the board connector snap behind latch ribs 102b (FIG. 22) of inner housing 102 of the cable connector. During this mating movement, latch ribs 102b of the cable connector bias latch arms 72 of the board connector transversely outwardly whereupon the distal ends of latch arms 72 abut the front nose 110a of pull latch 110. This causes the pull latch to be pushed rearwardly against the biasing of coil springs 134 (FIG. 20). When latch arms 72 pass latch ribs 102b, hooked ends 72a (FIG. 1) snap back inwardly behind the latch ribs. This allows a clearance between latch arms 72 and housing 62 of the board connector for nose end 110a of the pull latch to be biased forwardly by coil springs 134. This clearance is shown at 140 in FIG. 1. With the nose of the pull latch now being biased into the clearance between latch arms 72 and the inside of housing 62 of the board connector, the latch arms are locked or blocked from becoming disengaged from latch ribs 102b on the cable connector. When it is desired to unmate the connectors, pull latch 110 is pulled rearwardly against the biasing of coil springs 136 which, in turn, unblocks latch arms 72 of the board connector so that the latch arms can ride over latch ribs 102b of the cable connector and, thereby, unmate the connectors.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic termination system, comprising:
   a fiber optic cable including at least one optical fiber surrounded by an outer sheath, a length of the fiber being exposed at an end thereof, and with a crimp ring crimped to the outer sheath spaced from the fiber end; and
   a ferrule for terminating the optical fiber, and
   a housing assembly about the ferrule and including a housing part and a cover part movably mounted on the housing part for movement between an open position allowing assembly of the fiber optic cable, including said crimp ring, therewithin, and a closed position capturing the crimp ring within the housing assembly with the optical fiber terminated by the ferrule.

2. The fiber optic termination system of claim 1, including means pivotally mounted said cover part on the housing part.

3. The fiber optic termination system of claim 2 wherein said housing part includes a rear portion cooperating with the pivotally mounted cover part to capture the crimp ring therebetween, and including a boot about the rear end of the housing assembly for holding the cover part in its closed position.

4. The fiber optic termination system of claim 1, including a boot about the rear end of the housing assembly and engageable with at least a portion of the cover part for holding the cover part in its closed position.

5. The fiber optic termination system of claim 1, including a pin holder within the housing rearwardly of the ferrule for mounting at least one alignment pin.

6. The fiber optic termination system of claim 5 wherein said alignment pin projects through the ferrule and beyond a front mating face of the ferrule for alignment association with the complementary mating connector or other associated fiber optic transmission device.

7. The fiber optic termination system of claim 6, including spring means operatively associated between the pin holder and the housing for biasing the pin holder and the ferrule forwardly of the housing.

8. A method of fabricating a fiber optic connector assembly, comprising the steps of:

providing a fiber optic cable;

crimping a crimp ring about the cable, terminating the cable in a ferrule;

providing a housing assembly including a housing part and a cover part movably mounted on the housing part for relative movement between an open position and a closed position;

positioning the fiber optic cable, ferrule and crimp ring into the housing assembly with the cover part in its open position; and closing the cover part to capture the crimp ring within the housing assembly.

9. The method of claim 8, including pivoting the cover part relative to the housing part between said open and closed positions.

10. The method of claim 8, including the step of positioning a boot about the housing assembly to hold the cover part in its closed position capturing the crimp ring.

11. A fiber optic connector assembly for terminating at least one optical fiber of a fiber optic cable, comprising:

a housing for receiving the fiber optic cable and including a forward mating end and a rear end;

a ferrule within the forward mating end of the housing for terminating the optical fiber;

a cover movably mounted on the rear end of the housing for movement between an open position allowing assembly of the fiber optic cable and a closed position capturing the cable therewithin;

a boot about the rear end of the housing for holding the cover in its closed position; and a latch movably mounted on the housing intermediate the ends thereof for latching the connector to a complementary mating connector or other associated fiber optic transmission device.

12. The fiber optic connector assembly of claim 11, including means pivotally mounting the cover on the housing for pivotal movement between said positions.

13. The fiber optic connector assembly of claim 8 wherein said latch comprises a slide sleeve surrounding the housing.

14. The fiber optic connector assembly of claim 13, including spring means operatively associated between the slide sleeve and the housing for biasing the sleeve toward a latching condition.

15. A fiber optic connector assembly for terminating at least one optical fiber of a fiber optic cable, comprising:

a housing for receiving the fiber optic cable and including a forward mating end and a rear end;

a ferrule within the forward mating end of the housing for terminating the optical fiber;

a pin holder within the housing rearwardly of the ferrule for mounting at least one alignment pin; and spring means operatively associated between the pin holder and the housing for biasing the pin holder and the ferrule forwardly of the housing.

16. The fiber optic connector assembly of claim 15 wherein said spring means comprise a pair of springs spaced laterally of a longitudinal axis of the assembly.

17. The fiber optic connector assembly of claim 16 wherein said longitudinal axis extends generally centrally through the mating end of the housing, and said springs are spaced equidistant on opposite sides of the axis.

18. The fiber optic connector assembly of claim 15 wherein said alignment pin projects through the ferrule and beyond a front mating face of the ferrule for alignment association with the complementary mating connector or other associated fiber optic transmission device.

19. The fiber optic connector assembly of claim 18 wherein said spring means comprise a pair of springs spaced laterally of a longitudinal axis of the assembly.

20. The fiber optic connector assembly of claim 19 wherein said longitudinal axis extends generally centrally through the mating end of the housing, and said springs are spaced equidistant on opposite sides of the axis.

* * * * *